ёж

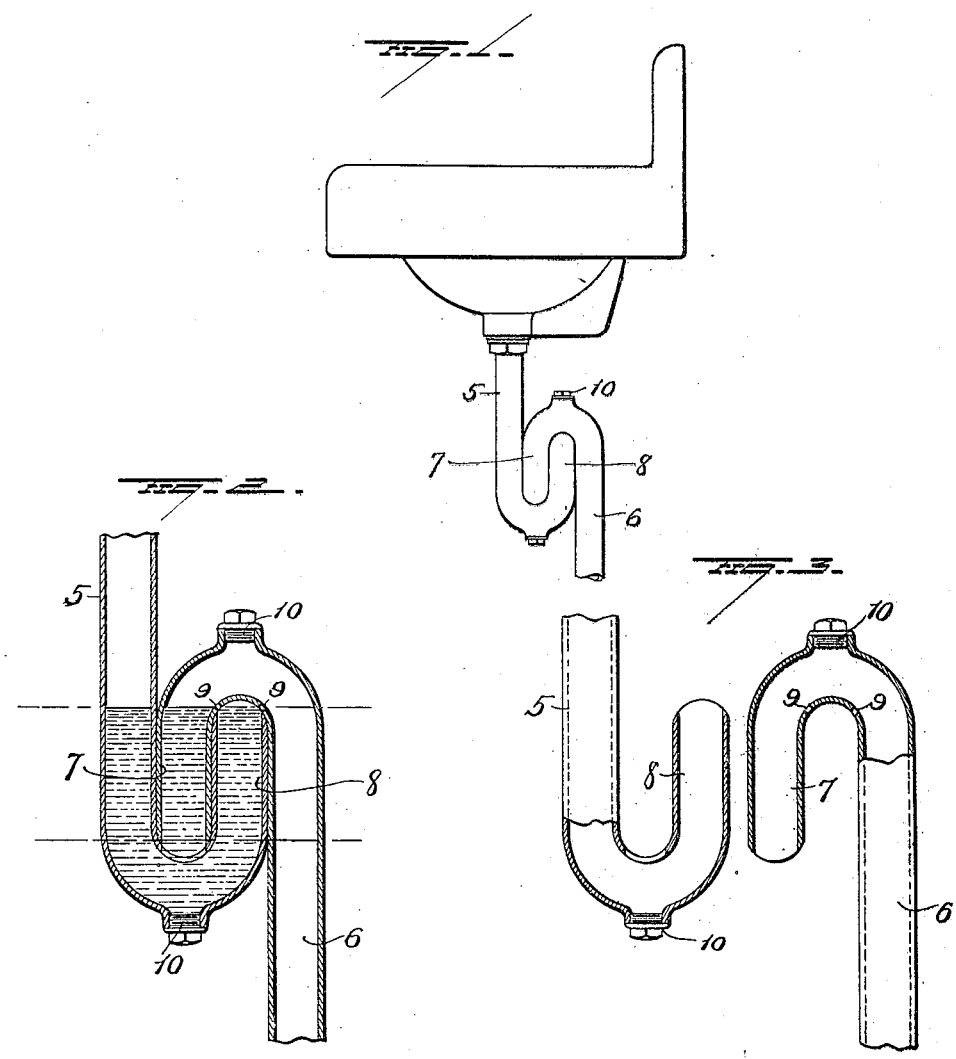

UNITED STATES PATENT OFFICE.

NORRIS C. LEONARD, OF BALTIMORE, MARYLAND.

SANITARY TRAP.

1,375,598.

Specification of Letters Patent.  Patented Apr. 19, 1921.

Application filed July 13, 1920. Serial No. 395,842.

*To all whom it may concern:*

Be it known that I, NORRIS C. LEONARD, a citizen of the United States, and a resident of Baltimore and State of Maryland, have invented certain new and useful Improvements in Sanitary Traps; and I do hereby declare the following to be a full, clear, and exact description of the invention, such as will enable others skilled in the art to which it appertains to make and use the same.

My invention relates to an improvement in sanitary traps for maintaining a water seal between a basin or other plumbing fixture and the waste pipe to which the basin or other fixture is connected, and it consists in the parts and combination of parts and details of construction as will be more fully explained and pointed out in the claims.

In the accompanying drawings, Figure 1 is a view of my improved trap applied to a wash basin; Fig. 2 is a view in vertical section through the trap, and Fig. 3 is a view of the trap sections before they are assembled.

The trap consists of two pipes 5 and 6 each bent into U-shape and each having one long and one short member as shown. The two pipes are assembled as shown in Fig. 1, with the two short members 7 and 8 side by side, the open end of member 7 having free open communication throughout the diameter of its lumen with pipe 5 at the bend in the latter adjacent the base of the short member 8, while the free upper end of the short member 8 has restricted communication with the pipe 6 at the bend thereof, through one or more small openings 9 of a size sufficient for the passage of air. The two pipes thus assembled are secured together by solder or otherwise so as to form a single unit with water tight joints at the free end of the short member: hence water entering pipe 5 from the basin will fill both short members 7 and 8 and stand in the trap in the plane of the upper bend of the latter, the excess or overflow passing down through pipe 6. When water is discharged into the pipe 5 it passes up into the short member 7 of pipe 6 and down the latter and if the flow be continued so that a considerable length of the long arm of pipe 6 be filled, the static pressure or weight of the water in the pipe 6 will, when the flow is discontinued, siphon or withdraw the water from the sections 5 and 7, the water in the short arm 8 remaining therein until the atmospheric balance is reestablished, which occurs as soon as the upper bend of the trap is free of water thus admitting air to the short member 8. As soon as air is admitted to the upper end of short member 8 through the opening 9 the water in said member 8 gravitates or settles down into the bend in pipe 5 and covers the lower end of short member 7 thus sealing the trap against the possibility of the passage of any noxious gases. The short member 8 should be of a size to hold sufficient water to seal the lower free end of member 7 and constitutes in effect a reservoir which operates to automatically and instantly refill the trap whenever the latter is emptied or partly emptied by suction or siphonage. As water is discharged into the pipe 5 it refills the short members 7 and 8 up to the bend in pipe 6 thus refilling the short member or reservoir 8, so that there is always a sufficient amount of water within the trap to immediately reseal the latter each time the water in the trap proper is siphoned out.

I prefer to provide each pipe 5 and 6 with a removable plug 10 so located as to permit all the parts of the trap to be gotten at for cleaning, the upper plug being so located preferably in the vertical plane of the perforations 9 connecting the bend in pipe 6 with the short member of pipe 5, so that the perforations may be easily gotten at for the removal of any grease or other matter that might settle therein.

After resealing occurs, following partial siphoning as a result of a free discharge of water from the basin, or other fixture to which the trap is attached, should a further impulse tending to disturb the seal occur in pipe 6 as a result of suction, or siphoning in another part of the drainage system, and which is independent of the discharge from the said basin, or other fixture, the partial vacuum thus created, and acting also within the pipe 8, above the water level, assists in increasing the amount of water in this chamber as the fluid is pushed forward from the course of the in-rushing air which enters through pipe 5 and passes up through 7 to 6 where the atmospheric balance is again established, allowing the water in pipe 8 to gravitate and reseal the trap.

It is evident that many slight changes might be resorted to in the relative arrangement of parts shown and described without departing from the spirit and scope of my invention hence I would have it understood that I do not wish to confine myself to the exact construction shown and described but, Having fully described my invention what I claim as new and desire to secure by Letters-Patent, is:—

1. A sanitary trap composed of two U-sections each having one long and one short member, one of said sections being inverted and each having the free end of its shorter member in open communication with the bend of its companion section.

2. A sanitary trap composed of two U-shaped sections each having one long and one short member, one of said sections being inverted, and each having the free end of its shorter member in open communication with the bend of its companion section, the opening between the bend of the inverted section and the free end of the shorter member of the other section being restricted for the passage of air only.

In testimony whereof, I have signed this specification in the presence of two subscribing witnesses.

NORRIS C. LEONARD.

Witnesses:
WM. C. WALKER,
EMILY HAMILTON.